United States Patent [19]
Inaba

[11] Patent Number: 5,737,655
[45] Date of Patent: Apr. 7, 1998

[54] STEREO CAMERA

[76] Inventor: Minoru Inaba, No. 1116, Oaza Samukawa, Oyama-shi, Tochigi-ken, Japan

[21] Appl. No.: 697,491

[22] Filed: Aug. 26, 1996

[51] Int. Cl.⁶ .................................................. G03B 35/08
[52] U.S. Cl. .......................... 396/324; 396/328; 396/338
[58] Field of Search ................................... 396/324, 325, 396/326, 329, 338

[56] References Cited

U.S. PATENT DOCUMENTS

| | | | |
|---|---|---|---|
| 1,596,835 | 8/1926 | Hewson | 396/326 |
| 1,871,281 | 8/1932 | Savage | 396/326 |
| 2,458,466 | 1/1949 | Campbell | 396/325 |
| 2,803,179 | 8/1957 | Donaldson | 396/326 |
| 3,068,772 | 12/1962 | MacNeille | 396/141 |
| 3,115,816 | 12/1963 | Muller | 396/327 |
| 3,608,458 | 9/1971 | Ratliff, Jr. | 95/18 |
| 3,687,031 | 8/1972 | Jahnsman | 95/11 |
| 3,953,869 | 4/1976 | Wah Lo et al. | 396/327 |
| 3,967,300 | 6/1976 | Oshima | 354/288 |
| 4,040,071 | 8/1977 | Shane | 396/325 |
| 4,249,798 | 2/1981 | Moskovich | 350/423 |
| 4,418,993 | 12/1983 | Lipton | 352/57 |
| 4,462,025 | 7/1984 | Murakami et al. | 340/743 |
| 4,597,659 | 7/1986 | Suda et al. | 354/409 |
| 4,712,900 | 12/1987 | Hamano et al. | 396/133 |
| 4,879,596 | 11/1989 | Miura et al. | 358/88 |
| 5,504,547 | 4/1996 | Mizukawa | 354/114 |
| 5,548,362 | 8/1996 | Wah Lo et al. | 396/326 |

*Primary Examiner*—Eddie C. Lee
*Attorney, Agent, or Firm*—Fattibene and Fattibene; Paul A. Fattibene; Arthur T. Fattibene

[57] ABSTRACT

A stereo camera optimally corrects a parallax despite a photographing distance. Lens boards of right and left photographing lenses are mounted with slide guides for obliquely feeding in an inter-optical axis distance approaching direction as the lens boards are fed. When a focusing knob is rotated, the photographing lenses and a finder lens are integrally advanced or retracted in response to the rotating direction of a cam shaft. The slide guides are so disposed that the right and left visual fields are brought into agreement at a close distance at the close distance photographing and the right and left visual fields are brought into agreement at the close distance as compared with the focal distance at the time of remote distance photographing. Accordingly, the unnatural of the remote or close distance feeling generated by the influence of the close distance subject at the human collimation at the time of remote distance photographing, and ideal stereo effect is obtained at all the photographing distances.

6 Claims, 11 Drawing Sheets

| L | $\Delta if$ | $S\ell$ | (mm) |
|---|---|---|---|
| ∞ | 0 | 0 | |
| ⋮ | ⋮ | ⋮ | |
| 6000 | 0.22 | 0.2 | |
| ⋮ | ⋮ | ⋮ | |
| 3000 | 0.44 | 0.4 | |
| ⋮ | ⋮ | ⋮ | |
| 2000 | 0.66 | 0.6 | |
| ⋮ | ⋮ | ⋮ | |
| 1000 | 1.34 | 1.2 | |
| 900 | 1.50 | 1.3 | |
| 800 | 1.70 | 1.5 | |
| 700 | 1.95 | 1.7 | |
| 600 | 2.30 | 2.0 | |
| 500 | 2.79 | 2.4 | |
| 400 | 3.56 | 3.0 | |
| 300 | 4.91 | 4.0 | |
| ⋮ | ⋮ | ⋮ | |

FIG 5

STEREO CAMERA

BACKGROUND OF THE INVENTION

1. Field of the Invention

The present invention relates to a stereo camera and, particularly, to a stereo camera in which inter-optical axis (principal axis) distance adjusting mechanism of two photographing lenses is provided.

2. Description of the Prior Art

It is general in a stereo camera for photographing two photographs at the same times by a pair of right and left photographing lenses that the inter-optical axis distance of the two photographing lenses is fixed. In the inter-optical axis distance fixed type stereo camera of this type, the positional deviation of a subject image of right and left photographing pictures is increased due to the parallaxes of the two photographing lenses as the subject distance becomes nearer. As shown exaggeratedly in FIG. 10, non-overlapping areas (a to b, c to d) are increased at the outside of the stereo photographing areas of right and left photographing pictures L and R.

When the photographing film is mounted in a stereo slide mount and appreciated by a stereo slide viewer, the non-overlapping areas (a to b, c to d) are not formed with a stereo image. As shown in FIG. 11, the edge of the window is overlapped on the boundary to obstruct the view. Accordingly, means for masking the non-overlapping areas (a to b, c to d) of the right and left pictures by selecting the stereo slide mount of a suitable window width by preparing a plurality of types of stereo slide mounts having different window widths is employed. Therefore, it is known that there are disadvantages that the loss of the picture width is large and the determinations of the mask amounts and the lateral positions of the pictures in the case of mounting are not easy.

Accordingly, the inventor of the present invention has proposed a stereo camera in which an automatic inter-optical axis distance adjusting mechanism for always bringing the visual fields of right and left photographing lenses at a focal distance into coincidence is provided to automatically correct a parallax in response to a photographing distance. Since this stereo camera so automatically adjusts the distance between the optical axis that the visual fields of the right and left photographing lenses are always brought into coincidence at the focal distance, the loss of the stereo photographing areas can be reduced, and rapid photographing is excellent. However, there exists not almost the state that all the objects in the pictures are disposed at the focal distance in fact, and the objects are frequently mixed at various distances. Since the human visual senses have collimation for noting a close range subject, when a main subject of a remote distance is focused, the inter-optical axis distance correcting amounts of the lenses might become insufficient with respect to the close range subject in the same pictures. When the stereo slide photographed in this manner is mounted in the viewer and appreciated, the close range subject is focused at the extremely close range to be observed unnaturally. In order to correct it, at the time of mounting, it is necessary to suitably mask the outer areas of the right and left pictures.

Therefore, even in the stereo camera having the automatic inter-optical axis distance adjusting mechanism, in the case of the close range photographing of 1 to 2 meters of the distance or except the close range photographing, it frequently needs to correct the parallax by masking the outer area of the picture by means such as the window width reduction of the slide mount or the mask screen at the time of mounting.

It therefore arises the technical subject to be solved to provide a stereo camera having an automatic inter-optical axis adjusting mechanism for reducing the loss of a stereo photographing area in an actual photographing state. The object of the present invention therefore is to solve the above-mentioned subject.

SUMMARY OF THE INVENTION

In order to accomplish the above-mentioned subject, the present invention provides a stereo camera comprising an automatic inter-optical axis distance correcting mechanism having independent lens boards mounting two photographing lenses for moving in parallel the lens boards in parallel in approaching directions as the lens boards are fed so that the optical axes of the two photographing lenses approach to bring the visual fields of the two photographing lenses at a focal position into coincidence, and slide guides of the lens boards provided to move on a linear line for coupling an enlarged position where the principal points of the two photographing lenses are shifted in the approaching direction from the right and left picture pitches at the infinite remote focal position to the contracted position where the visual fields of the two photographing lenses are brought into coincidence at the shortest focal distance, thereby automatically correcting the distance between the optical axes by the slide guides.

BRIEF DESCRIPTION OF THE DRAWINGS

FIG. 5 is a table exemplifying the numeric value of a shifting amount S1 to a feeding amount if of the photographing lens;

DESCRIPTION OF THE PREFERRED EMBODIMENTS

Figure 1:
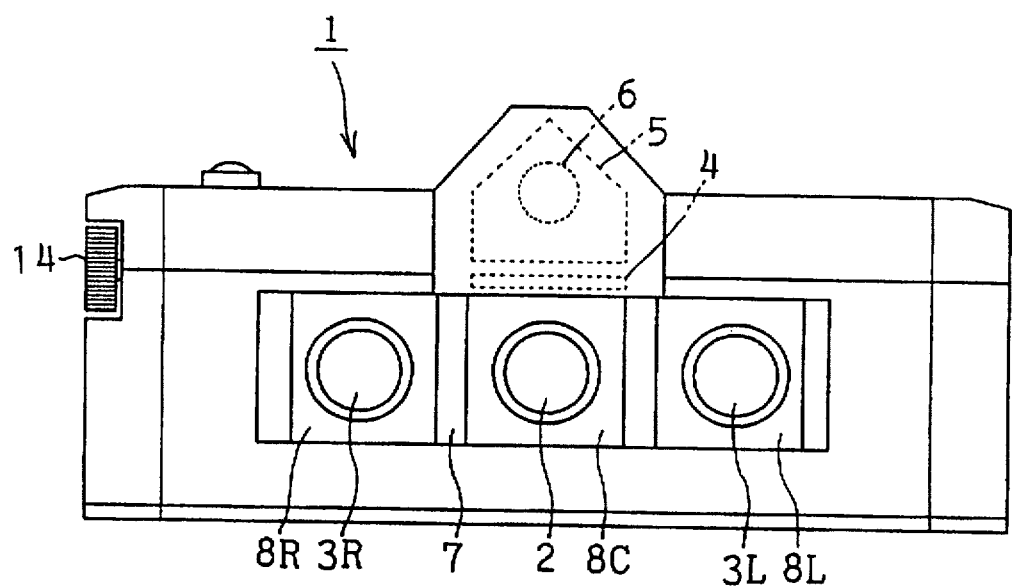
FIG. 1 is a front view of a three-lens stereo camera, illustrating one embodiment of the present invention.

Embodiments of the present invention will now be described in detail. FIG. 1 illustrates a three-lens stereo camera 1 as one example of a stereo camera, wherein a finder lens 2 and a pair of right and left photographing lenses 3R and 3L are arranged in one lateral row at the center of the front surface of a camera body, and the optical axes of the three lenses are disposed in parallel in the same plane. A focal plane shutter (not shown) is disposed immediately before the film surface behind the photographing lenses 3R and 3L, and a 45-degree reflect mirror (not shown) is fixed behind the finder lens 2 having the same lens characteristics as the photographing lenses 3R and 3L. A light incident to the finder lens 2 is focused on an upper focal plate 4 via a reflex mirror, and an erect image can be observed via a pentaprism 5 and eyepieces 6 similarly to the general one-lens reflect camera.

Figure 2:
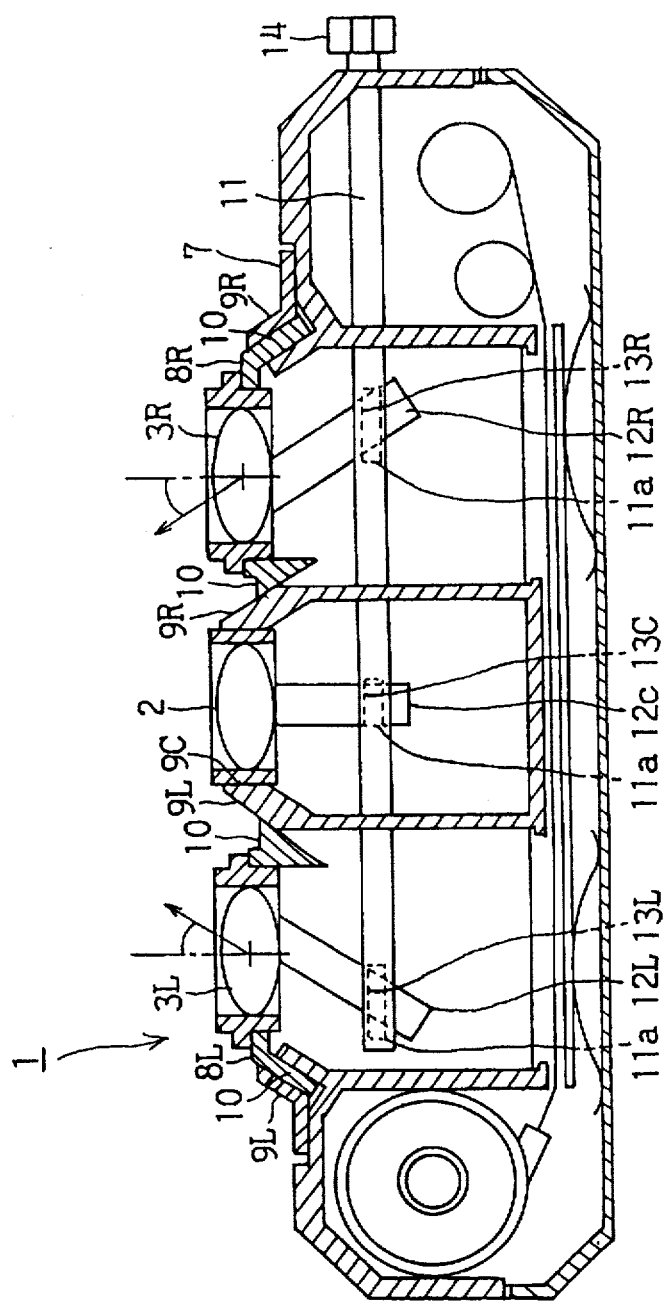
FIG. 2 is a plan sectional view of the three-lens stereo camera.

FIG. 2 illustrates an inter-optical axis distance automatic adjusting type focus adjusting mechanism of the stereo camera 1. Slide guides 9R and 9L for obliquely sliding right and left lens boards 8R and 8L for mounting photographing lenses 3R and 3L in a direction for approaching the distance between the optical axes of the photographing lenses 3R and 3L as the lens boards 8R and 8L are fed are symmetrically molded at the lens mount 7 of a camera body, and sliders 10 provided at both the right and left sides of the lens boards 8R and 8L are engaged with the slide guides 9R and 9L. A lens board 8C of the lens finder 10 is mounted at a slide guide 9C formed in an optical axis direction, and linearly moved in the optical axis direction.

Figure 3:
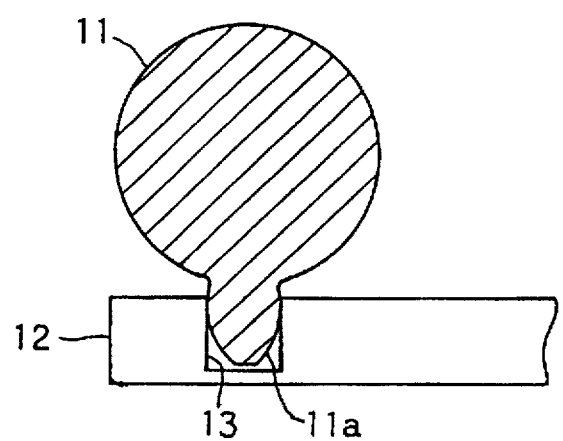
FIG. 3 is a sectional view illustrating the engaged state of an involute cam shaft with a groove in FIG. 2.

An involute toothform sectional cam shaft 11 for adjusting a focus in a lateral direction is installed in the camera body, and arms 12L, 12C and 12R protruding from the lower ends of the lens boards 8L, 8C and 8R are provided at the lens boards 8L, 8C and 8R. As shown in FIG. 3, an involute cam 11a of the cam shaft 11 is engaged with the rectangular sectional grooves 13L, 13C and 13R molded at the upper surfaces of the arms. Accordingly, when the focusing knob 14 engaged with the end of the cam shaft 11 is rotated, the photographing lenses 3R and 3L and the finder lens 2 are integrally advanced or retracted in response to the rotating direction of the cam shaft 11, and the eyepiece 6 is observed to adjust the focus. When the photographing lenses 3R and 3L and the finder lens 2 are fed, the photographing lenses 3R and 3L are shifted in the approaching direction along the slide guides 9R and 9L, thereby automatically correcting the parallaxes of the photographing lenses 3R and 3L with respect to the subject. A backlash is eliminated by the combination of the involute cam 11a and the rectangular sectional grooves 13L, 13C and 13R, and accurate focusing adjustment can be performed.

Figure 4:
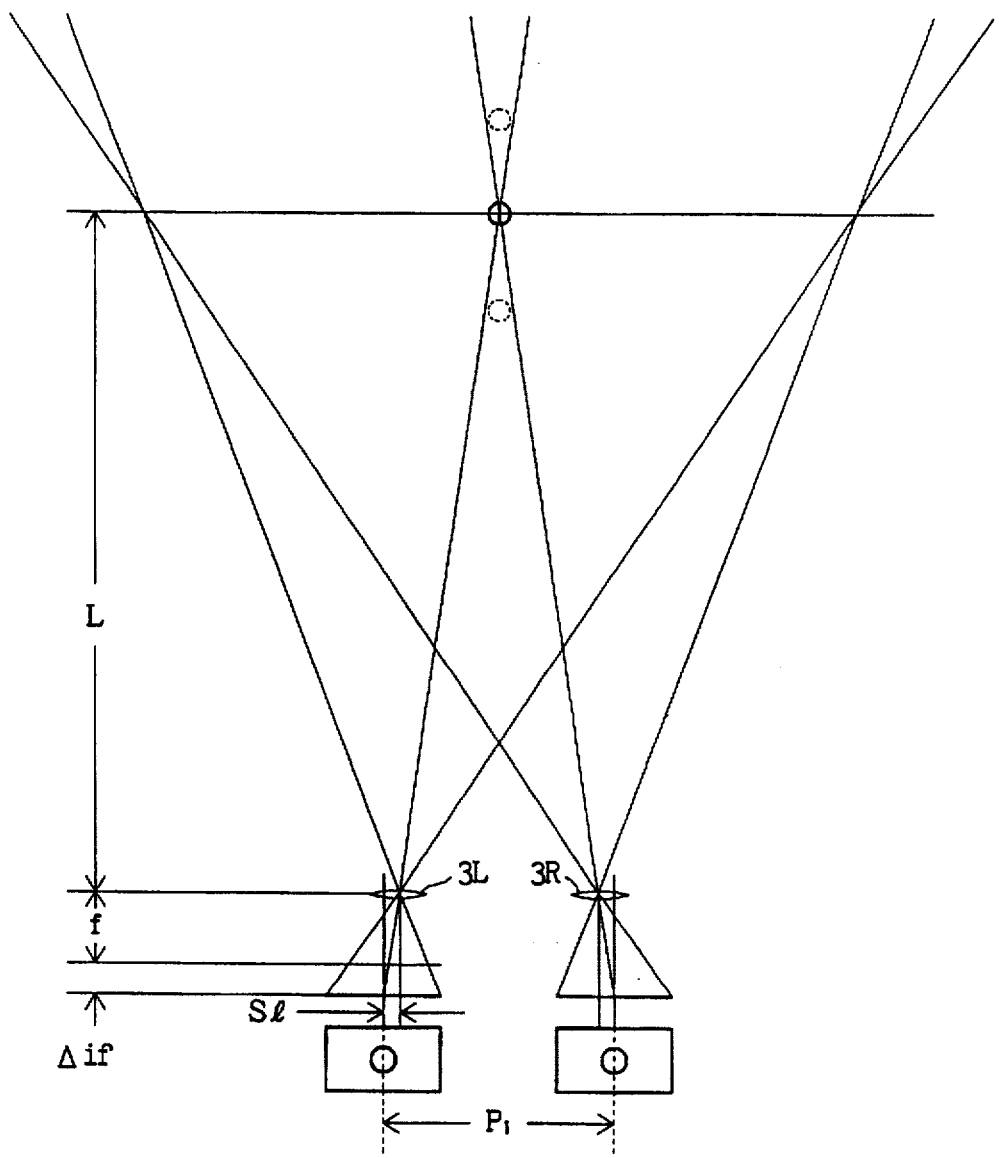
FIG. 4 is an explanatory view representing the relationship between the focus of a photographing lens and a distance between optical axes to bring the right and left lens visual fields.

FIG. 4 illustrates the relationship between the focus of the photographing lens and the distance between the optical axes to bring the visual fields of the right and left photographing lenses 3R and 3L at the focal distance into coincidence. Let it now be presumed that a piece of thin lens is employed and that:

Focal distance of the lens - - - f

Distance from the subject to the principal point of the lens - - - L

Distance from the focal point of the lens to the image-forming position - - - if.

Then, there holds $if = f^2/L-f$ and, hence, the distance between the principal point of the lens to the surface of the film becomes $f+if$.

Moreover, if the pitch between the right and left exposing surfaces of the stereo camera is $P_1$, the shifting amount of the right and left lenses for bringing the right and left photographing ranges into agreement is given by, $$S1=(P_1/2)\times(f+if/L+f+if).$$

That is, the right and left lenses may be moved in a direction to approach each other by a shifting amount S1 calculated from the above equation with a decrease in the distance L from the subject to the principal point of the lens.

FIG. 5 is a table for illustrating the relationship between the feeding amount if of the lens and the shifting amount S1 based on the above equation of the case that the focal distance of the lens is 36 mm and the pitch $P_1$ of the right and left exposing surfaces is 66 m. The locuses of the principal point of the photographing lenses are drawn in a smooth exponential curve as shown by a broken line in FIG. 6.

Figure 6:
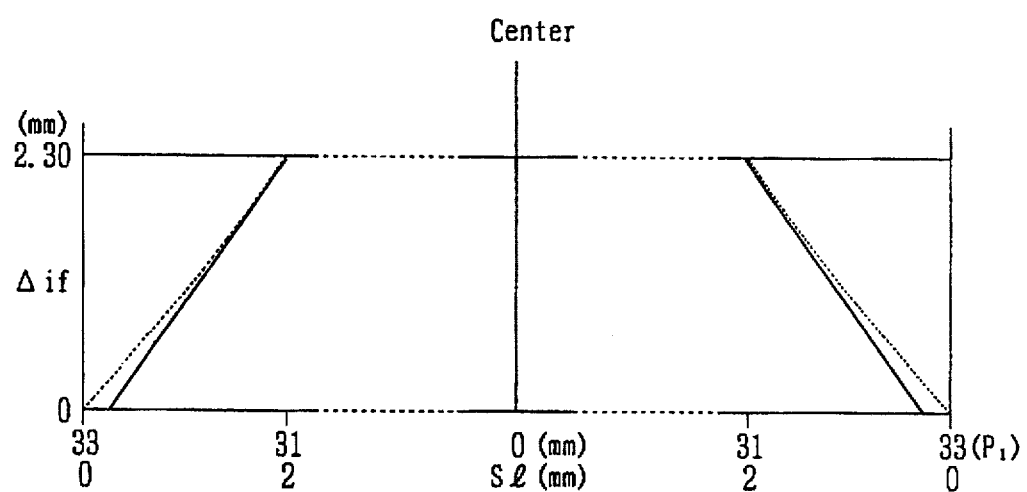
FIG. 6 is a graph illustrating the locus of the principal point of the photographing lens of the stereo camera of the present invention.

In the inter-optical axis distance automatic adjusting type focus adjusting mechanism of the stereo camera of the present invention, as shown by a solid line in FIG. 6, the photographing lenses 3R and 3L are so formed as to linearly obliquely move along the tangential line of the shortest photographing distance point of the principal point locus in the calculation as shown by a broken line (here, the shortest photographing distance is 600 mm, and the maximum feeding amount of the lens if=2.30 mm of the lens.) Accordingly, the visual fields of the right and left photographing lenses 3R and 3L at the shortest photographing distance are brought into coincidence, but the shifting amount S1 does not become zero in the state that the feeding amount if is zero infinite remote photographing, and in calculation, the inter-optical axis distance correcting amount at the time of photographing at the remote distance is so designed as to be slightly excessive.

However, it is almost not that the subject of the close distance is included from the principal subject in the picture at the close range photographing as described above, and the visual fields of the right and left photographing lenses at the focal distance must be brought into agreement, but if the subject is photographed by focusing at remote distance, other subject frequently exists at the close distance from the focal position. Accordingly, as the present invention, the stereo camera is so constituted that the visual fields of the right and left photographing lenses are brought into agreement at the close distance as compared with the focal position as the photographing distance is remote, and hence the inter-optical distance correction insufficiency frequently occurring by the influence of the conventional close distance subject can be eliminated, and more actual correcting amount can be set.

Figure 7:
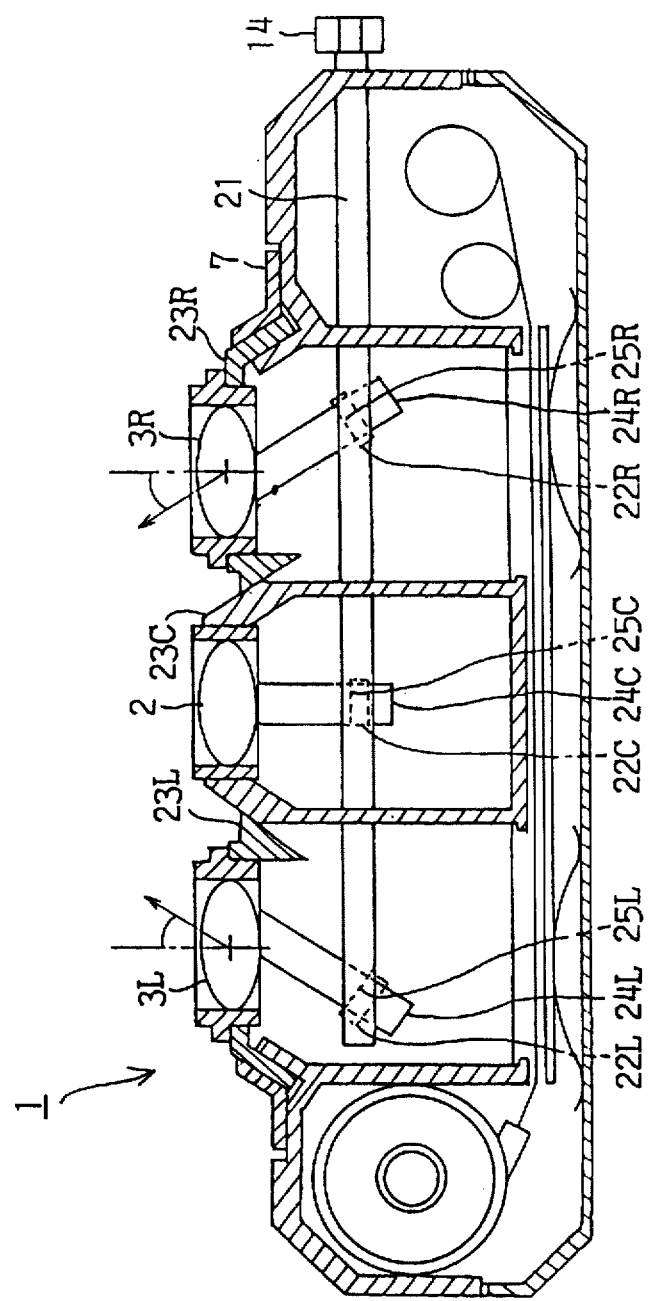
FIG. 7 is a plan sectional view of a three-lens stereo camera, illustrating another embodiment of the present invention.
Figure 8:
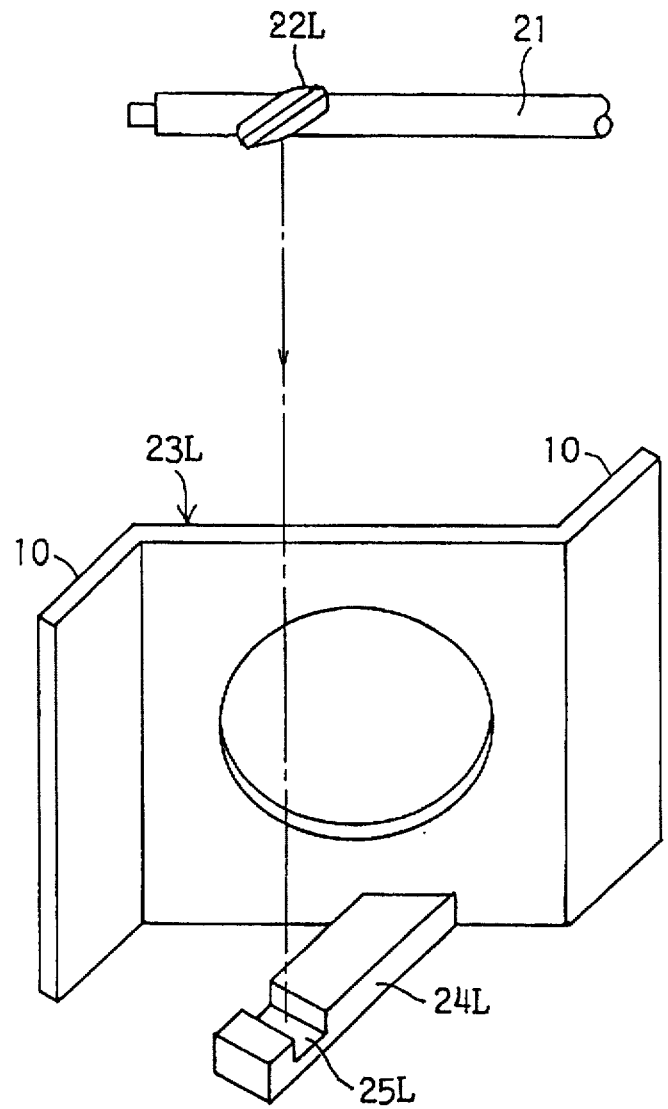
FIG. 8 is a perspective view of a lens board and a cam shaft shown in FIG. 7.

FIGS. 7 and 8 illustrate another embodiment of an inter-optical axis distance automatic adjusting type focus adjusting mechanism. Helical involute cams 22R and 22L are provided at an angle coincident with the oblique feeding direction of photographing lenses 3R and 3L at the right and left sides of a cam shaft 21 shown in FIG. 7, and an involute cam 22C in parallel with the cam shaft 21 is similarly provided to the stereo camera of FIG. 2 at the center.

Rectangular sectional grooves 25R and 25L are provided in a direction perpendicular to the sliding direction of lens boards 23R and 23L at the arms 24R and 24L of the lens boards 23R and 23L of photographing lenses 3R and 3L, helical involute cams 22R and 22L are engaged, and the rectangular sectional groove 25C of the arm 24C of the lens board 23C of the finder lens 2 is engaged with the central involute cam 22C.

In this inter-optical axis distance automatic adjusting type focus adjusting mechanism, the direction of the force operating the lens boards 23R and 23L coincides with the sliding direction of the lens board by the rotations of the helical involute cams 22R and 22L, and, hence, there is an advantage that the sliding of the lens boards 23R and 23L become more smooth.

The stereo camera of the present invention automatically corrects the parallaxes of the photographing lenses 3R and 3L in cooperation with the focus adjustment, and the subject of the closer range than the focal position in the case of remote distance photographing is photographed at the same position at the right and left pictures. Further, since the distance between the optical axes of the photographing lenses is automatically corrected, the subject of the extremely close distance as compared with the focal distance might slightly lack the inter-optical distance correcting amount, but as compared with not only the general stereo camera having no inter-optical axis distance adjusting mechanism but also the conventional stereo camera having automatic inter-optical distance adjusting mechanism, the degree of the correction insufficiency is remarkably reduced.

Accordingly, it is not almost necessary to correct the parallax by adjusting the film pitch in the case of mounting the film in the stereo slide mount. If the stereo slide mount having the window of the same size as the real picture size is used and the film is mounted at the home position, the stereo image of the close distance subject is not focused at the close distance in the case of appreciating via the stereo slide viewer, but the stereo slide of natural stereo effect is obtained.

Figure 9:
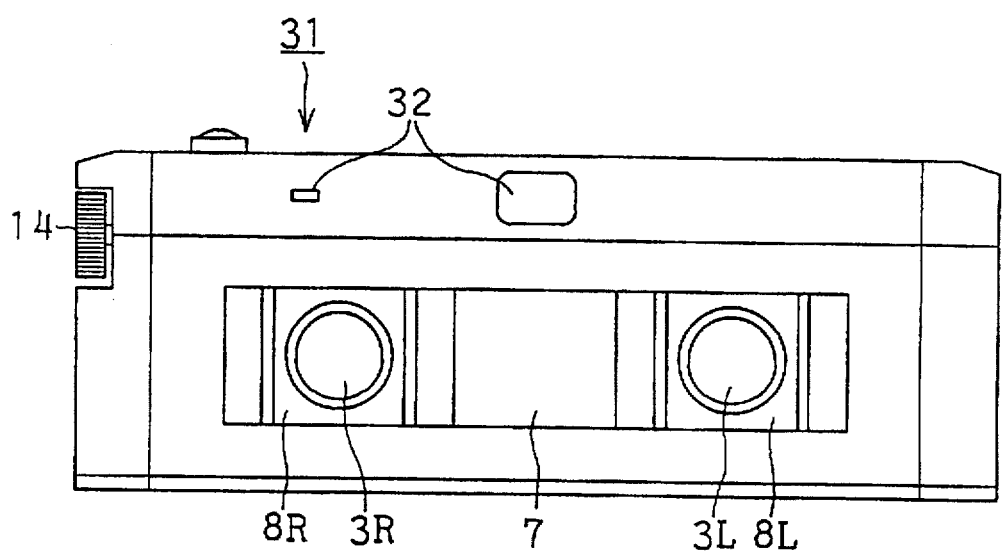
FIG. 9 is a front view of a two-lens stereo camera, illustrating the still another embodiment of the present invention.
Figure 10:
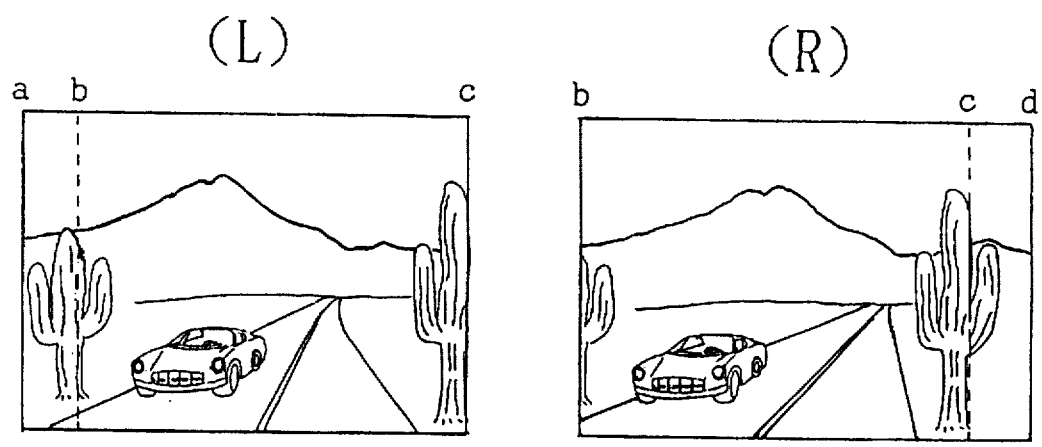
FIGS. 10L and 10R are explanatory views of the photographed results of conventional stereo camera.
Figure 11:
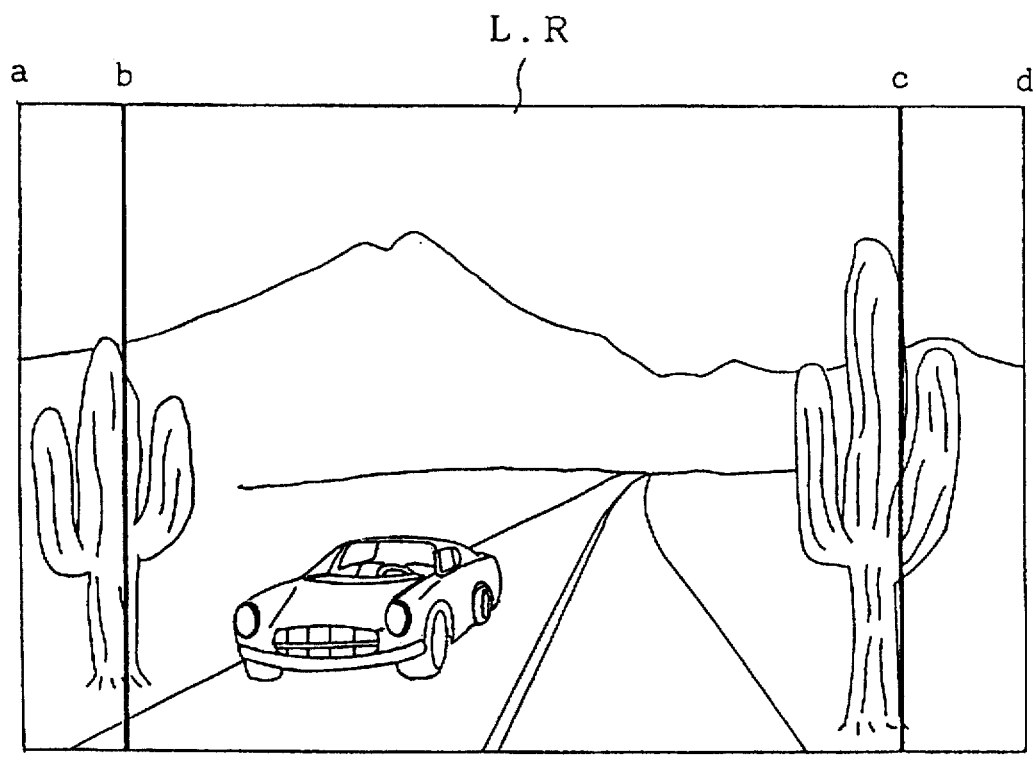
FIG. 11 is an explanatory view representing the picture loss of the stereo slide of FIG. 10.

As still another embodiment of the present invention, like a two-lens type stereo camera 31 shown in FIG. 9, a rangefinder type range finder 32 may be placed instead of the pentaprism, or a transmission type real image type finder may be employed. Further, for example, a range finding element and an MPU, and a stepping motor for driving a focus adjusting cam shaft are provided to form a known active or passive type auto-focusing control mechanism, and the inter-optical axis distance automatic adjusting type focus adjusting mechanism may be automatically controlled by the autofocusing mechanism.

According to the stereo camera of the present invention as described above, the visual fields of the right and left photographing lenses are brought into agreement at the focal distance in the close distance photographing, the parallax is completely corrected, and the visual fields of the right and left photographing lenses are brought into agreement at the close distance at the focal distance in the remote distance photographing. Accordingly, at the time of remote range photographing, the human collimation is not affected by the unnatural remote or close distance feeling, and substantially ideal stereo effect is obtained at all photographing distances.

The present invention is in no way limited to the above-mentioned embodiments only but can be modified in a variety of ways within the technical scope of the invention.

I claim:

1. A stereo camera comprising an automatic inter-optical axis distance correcting mechanism having independent lens boards having sliders mounting two photographing lenses having optical axes, visual fields, and a shortest focal distance for moving the lens boards in parallel in approaching directions as the lens boards are moved by a focusing mechanism so that the optical axes of the two photographing lenses approach to being the visual fields of the two photographing lenses at a focal position into coincidence, and slide guides of the lens boards provided to move on a linear line to a position where principal points of the two photographing lenses are shifted in the approaching direction from right and left picture pitches at an infinite remote focal position to another position where the visual fields of the two photographing lenses are brought into coincidence at the shortest focal distance, thereby automatically correcting the distance between the optical axes by the slide guides coupled to the sliders and the focusing mechanism.

2. A stereo camera comprising:

a camera body;

a first lens board slidebly mounted on said camera body;

a first lens placed within said first lens board, said first lens having a first optical axis and a first visual field;

a second lens board slidebly mounted on said camera body;

a second lens placed within said second lens board, said second lens having a second optical axis and a second visual field, the first optical axis and the second optical axis being separated by a distance;

focusing means, coupled to said first lens and said second lens, for moving said first lens along the first optical axis and said second lenses along the second optical axis and focusing on a principal subject, cam means, coupled to focusing means and said first and second lens boards, for moving said first lens and said second lens each along a linear path that is tangent to a smooth exponential curved line formed by a path that would bring the right and left visual fields into agreement correcting for parallax, whereby upon focusing on the principal subject the distance between said first optical axis and said second optical axis is changed correcting for parallax resulting in an improved stereo image.

3. A stereo camera as in claim 2 wherein:

the smooth exponential curve is formed according to the following equation, $$s/=(P_1/2)\times(f+if/L+f+if)$$

where, $P_1$=a pitch between a first and second exposing surface, f=a focal distance of said first and second lens, L=distance from a subject to a principal point of said first and second lenses, if=distance from a focal point of said first and second lenses to an image forming position.

4. A stereo camera as in claim 2 wherein:

the linear paths are tangent at a point where said first and second lenses are at a shortest photographing distance point.

5. A stereo camera comprising:

a camera body;

a first lens board slidebly mounted on said camera body;

a first lens placed within said first lens board, said first lens having a first optical axis;

a second lens board slidebly mounted on said camera body;

a second lens placed within said second lens board, said second lens having a second optical axis, the first optical axis and the second optical axis being separated by a distance;

a first arm attached at one end to said first lens board;

a second arm attached at one end to said second lens board;

a first cam placed on said first arm;

a second cam placed on said second arm;

a cam shaft coupled to said first cam and said second cam;

focusing means, coupled to said cam shaft, for focusing on a principal subject, whereby upon focusing on the principal subject the distance between said first optical axis and said second optical axis is changed correcting for parallax resulting in an improved stereo image.

6. A stereo camera comprising:

a camera body;

a right slider guide engaging said camera body;

a right lens board slidebly mounted on said right slider guide, said right slider guide obliquely sliding said right lens board;

a right photographing lens placed within said right lens board, said right photographing lens having a first optical axis;

a left slider guide engaging said camera body;

a left photographing lens board slidebly mounted on said left slider guide, said left slider guide obliquely sliding said left lens board;

a left lens placed within said left lens board, said left lens having a second optical axis, the first optical axis and the second optical axis being separated by a distance;

a central slider guide placed between said right slider guide and said left slider guide;

a finder lens place within said central slider guide;

a right arm attached at one end to said right lens board;

a left arm attached at one end to said left lens board;

a center arm attached at one end to said finder lens;

a first cam placed on said first arm;

a second cam placed on said second arm;

a third cam placed on said center arm;

a cam shaft coupled to said first, second, and third cams;

focusing means, attached to said cam shaft, for adjusting the focus of said finder lens, whereby upon focusing on the principal subject the distance between said first optical axis and said second optical axis is changed correcting for parallax resulting in an improved stereo image.

* * * * *